(12) United States Patent
McCauley et al.

(10) Patent No.: US 10,493,808 B1
(45) Date of Patent: Dec. 3, 2019

(54) CENTRAL TIRE INFLATION SYSTEM

(71) Applicants: Scott McCauley, Cape Canaveral, FL (US); Alfred Robert Tomlinson, Beverly Hills, FL (US)

(72) Inventors: Scott McCauley, Cape Canaveral, FL (US); Alfred Robert Tomlinson, Beverly Hills, FL (US)

( * ) Notice: Subject to any disclaimer, the term of this patent is extended or adjusted under 35 U.S.C. 154(b) by 196 days.

(21) Appl. No.: 15/660,065

(22) Filed: Jul. 26, 2017

(51) Int. Cl.
*B60C 23/00* (2006.01)
*B60C 29/06* (2006.01)
*B60S 5/04* (2006.01)

(52) U.S. Cl.
CPC .......... *B60C 23/003* (2013.01); *B60C 29/066* (2013.01); *B60C 29/068* (2013.01); *B60S 5/046* (2013.01); *B60C 2200/06* (2013.01)

(58) Field of Classification Search
CPC ... B60C 23/003; B60C 29/066; B60C 29/068; B60S 5/046
See application file for complete search history.

(56) References Cited

U.S. PATENT DOCUMENTS

| | | | | |
|---|---|---|---|---|
| 5,180,456 A | * | 1/1993 | Schultz | B60C 23/003 141/1 |
| 5,629,873 A | * | 5/1997 | Mittal | B60C 23/003 152/415 |
| 2004/0035196 A1 | * | 2/2004 | Claussen | B60C 23/003 73/146 |
| 2007/0204946 A1 | * | 9/2007 | Medley | B60B 25/12 152/427 |
| 2013/0282232 A1 | * | 10/2013 | Medley | B60C 23/003 701/34.4 |
| 2014/0224352 A1 | * | 8/2014 | Racine | B60C 23/003 137/223 |
| 2015/0174972 A1 | * | 6/2015 | Zhou | B60C 23/003 340/447 |
| 2016/0068033 A1 | * | 3/2016 | Ingram | B60C 23/003 141/4 |
| 2018/0104994 A1 | * | 4/2018 | Lin | B60C 23/12 |
| 2018/0186198 A1 | * | 7/2018 | Zhou | B60C 23/04 |

* cited by examiner

*Primary Examiner* — Kip T Kotter
(74) *Attorney, Agent, or Firm* — Gulf Coast Intellectual Property Group (57) ABSTRACT

A central tire inflation system that is operably coupled to a vehicle wherein the system is operable to monitor and control the tire air pressure of the vehicle. The central tire inflation system includes a wheel assembly that includes a housing having an annular central portion with opposing arm members extending outward therefrom. The annular central portion includes an interior volume having a valve and a bearing/cap assembly. A controller is further provided wherein the controller includes a central processing unit. A valve is disposed within the controller and is operably coupled to three ports wherein a first port provides a fluid connection to the wheel assembly. The central tire inflation system further includes a control panel having a graphical display operable to provide a user interface for operation of the central tire inflation system. A plurality of operational modes are provide for selection by a user.

4 Claims, 5 Drawing Sheets

CENTRAL TIRE INFLATION SYSTEM

FIELD OF THE INVENTION

The present invention relates generally to tire inflation and deflation systems, more specifically but not by way of limitation a central tire inflation system for vehicles that includes air shutoff valves inside each wheel of the vehicle and further provides adjustability to accommodate alternate size vehicles.

BACKGROUND

Central tire inflation systems are commonly utilized on large commercial trucks so as to increase the performance of the truck across alternate terrain types. By way of example but not limitation, inflation systems are common on military vehicles that must traverse alternate terrains during a mission wherein the vehicle may be traversing across loose sand to asphalt in a single trip. It is desirable during traversing across different terrains such as the aforementioned to inflate and/or deflate the tires so as to optimize traction and other performance parameters for the instant terrain.

One issue with existing tire inflation systems is the use of external shut off valves. Utilization of external shutoff valves prevents the ability for the central tire inflation system to maintain a minimum tire pressure in the event of a tire emergency. If a tire suffers a catastrophic failure on a conventional central tire inflation system the tire can completely lose all of its air pressure, which can cause the tire to dislodge from the wheel and cause more damage to the vehicle. A further issue with existing central tire inflation systems is their inability to adjust to various vehicle wheel sizes and bolt patterns. Existing systems are limited to the wheel sizes and are unable to adjust to accommodate alternate wheel sizes restricting the ability for the central tire inflation system to be moved between vehicles. Lastly, current technology does not permit adjustment of the release valve so as to prevent tires from going flat and further ensure a minimum tire pressure is maintained.

Accordingly, there is a need for a central tire inflation system that is configured to provide adjustability to accommodate alternate wheel sizes and further provide an adjustable valve means so as to inhibit a tire from completing losing air pressure.

SUMMARY OF THE INVENTION

It is the object of the present invention to provide a central tire inflation system configured to ensure the tires of a vehicle will maintain a minimum tire pressure that includes an assembly having a central housing with opposing arms extending outward therefrom.

Another object of the present invention is to provide a central tire inflation system operable to provide control of the tire pressure of a vehicle wherein the central housing has disposed in the cavity thereof an air check valve.

A further object of the present invention is to provide a central tire inflation system configured to ensure the tires of a vehicle will maintain a minimum tire pressure and further provide increase or decrease thereof that includes a controller operable to provide operation of the central tire inflation system.

Still another object of the present invention is to provide a central tire inflation system operable to provide control of the tire pressure of a vehicle wherein the controller includes a valve having intake and release ports operably coupled thereto and further includes a central processing unit.

An additional object of the present invention is to provide a central tire inflation system configured to ensure the tires of a vehicle will maintain a minimum tire pressure and further provide increase or decrease thereof that further includes a graphical display unit operably coupled to the controller providing a means to interface with the central tire inflation system.

Yet a further object of the present invention is to provide a central tire inflation system operable to provide control of the tire pressure of a vehicle wherein the graphical display unit provides a plurality of operation screens configured to deliver a multitude of functions for the central tire inflation system.

Another object of the present invention is to provide a central tire inflation system configured to ensure the tires of a vehicle will maintain a minimum tire pressure and further provide increase or decrease thereof wherein the central processing unit is further configured to maintain a data log of all activities of the central tire inflation system.

Still and additional object of the present invention is to provide a central tire inflation system operable to provide control of the tire pressure of a vehicle wherein the air check valve includes an adjustment screw integrated into the rear surface of the central housing so as to establish the minimum tire pressure.

An additional object of the present invention is to provide a central tire inflation system configured to ensure the tires of a vehicle will maintain a minimum tire pressure and further provide increase or decrease thereof wherein the central housing includes an air port fluidly coupled to the inflation stem of each tire.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a central tire inflation system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 1:
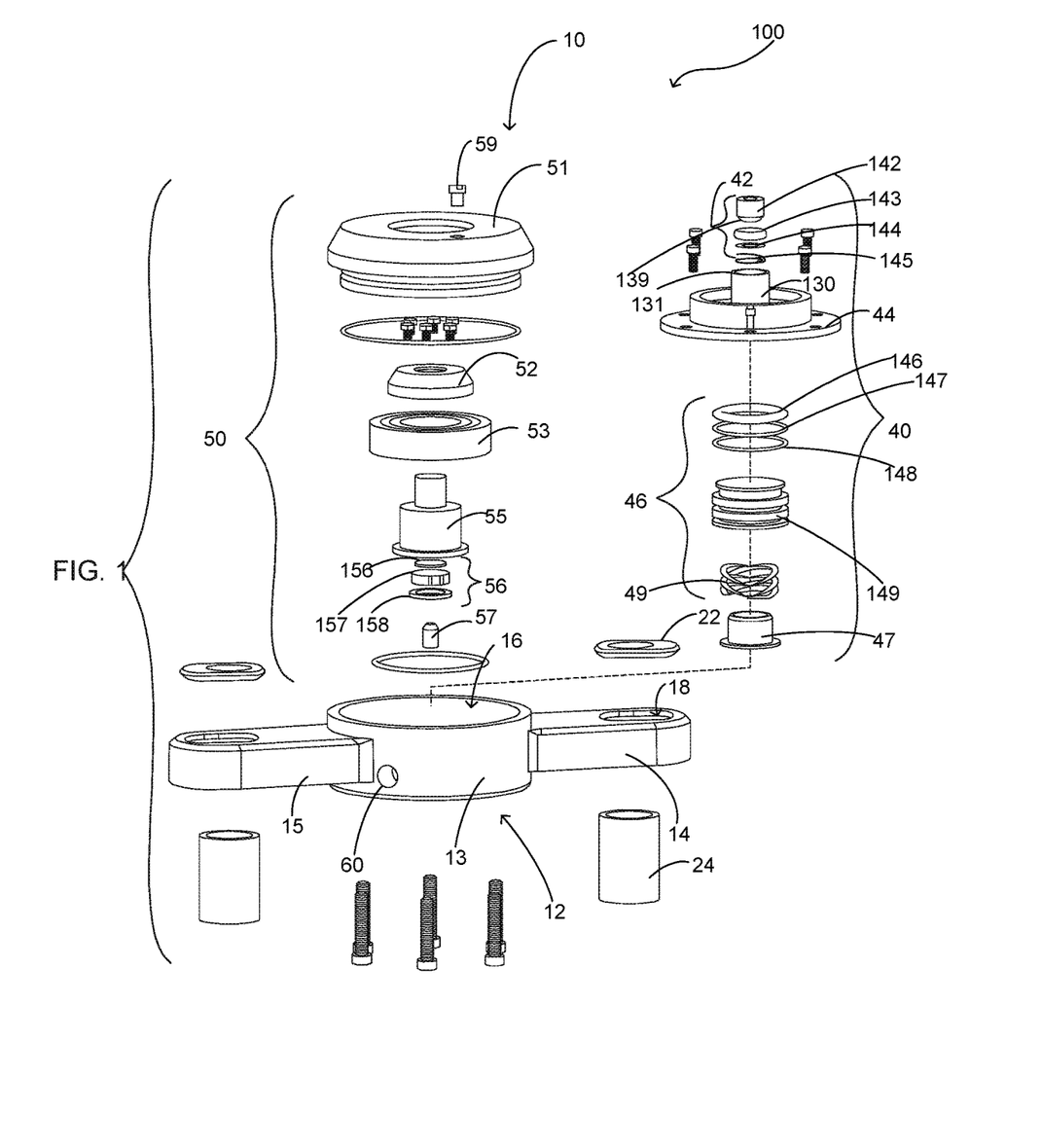
FIG. 1 is an exploded view of the wheel assembly preferred embodiment of the present invention.
Figure 2:
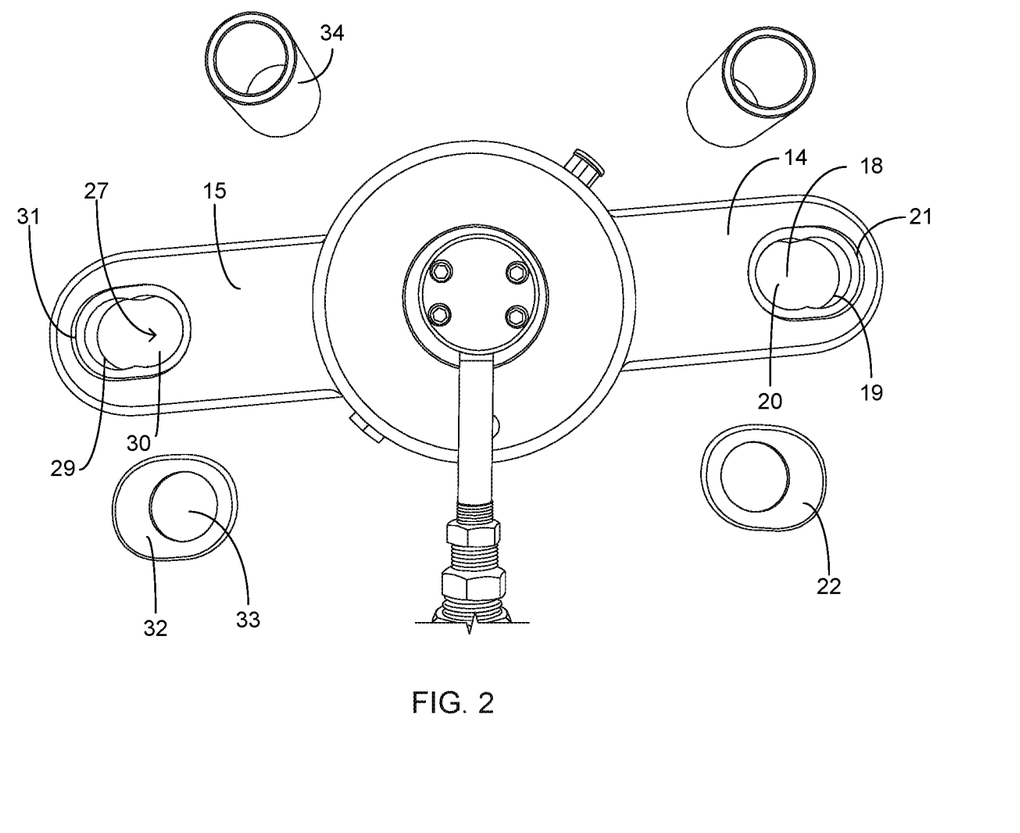
FIG. 2 is a top view of the wheel assembly of the present invention.

Referring now in particular to FIGS. 1 and 2 herein, the central tire inflation system 100 further includes a wheel assembly 10. The wheel assembly is provided to be mounted to each wheel of a vehicle in which the central tire inflation system 100 has been installed. The wheel assembly 10 includes a housing 12 wherein the housing 12 includes a central portion 13 and a first arm member 14 and second arm member 15. The housing 12 is manufactured from a suitable durable material such as but not limited to aluminum. The central portion 13 of the housing is annular in shape and includes cavity 16. Integrally formed with the central portion 13 of the housing 12 are first arm member 14 and second arm member 15. The first arm member 14 and second arm member 15 are formed on opposing sides of the central portion 13 of the housing 12. First arm member 14 and second arm member 15 function to span substantially across a vehicle wheel so as to be operably coupled thereto. It is contemplated within the scope of the present invention that the housing 12 could be manufactured in alternate sizes so as to accommodate vehicle wheels having different diameters. First arm member 14 further includes aperture 18 journaled therethrough distal to the central portion 13. The aperture 18 is a joined circle configuration having a first portion 19 and second portion 20 wherein the aperture 18 is generally oval in shape. The joined circle configuration of the aperture 18 provides a technique for the wheel assembly 10 to be operably coupled to various lug patterns of wheels of vehicles. The joined circle configuration permits lateral adjustment of a fastening lug to provide optimum positioning. The aperture 18 further includes ledge 21 wherein ledge 21 is circumferentially disposed around aperture 18. Ledge 21 functions to releasably secure adapter ring 22 therein. Ring adapter 22 further includes hole 23 suitable in size so as to accommodate a bolt therethrough. Operably coupled to aperture 18 is wheel mount 24. Wheel mount 24 is cylindrical in shape being hollow so as to accommodate a bolt therethrough. Second arm member 15 further includes aperture 27 journaled therethrough distal to the central portion 13. The aperture 27 is a joined circle configuration having a first portion 29 and second portion 30 wherein the aperture 27 is generally oval in shape. The aperture 27 further includes ledge 31 wherein ledge 31 is circumferentially disposed around aperture 27. Ledge 31 functions to releasably secure adapter ring 32 therein. Ring adapter 32 further includes hole 33 suitable in size so as to accommodate a bolt therethrough. Operably coupled to aperture 27 is wheel mount 34. Wheel mount 34 is cylindrical in shape being hollow so as to accommodate a bolt therethrough. Wheel mount 34 in combination with wheel mount 24 functions to provide a standoff mounting technique for housing 12. Further, the joined circle configurations of apertures 18,27 provide the ability to laterally position a fastener therein so as to accommodate alternate wheel diameters.

Disposed within cavity 16 of the central portion 13 are the check valve assembly 40 and the bearing/cap assembly 50. The check valve assembly 40 functions as a conventional check valve allowing air flow into the wheel assembly 10 and is configured to maintain a minimum tire pressure to a tire on a wheel to which the wheel assembly 10 is mounted. The check valve assembly 40 includes upper seal/spring group 42. A seat cup assembly 44 is further included. The upper seal/spring group 42 further includes a seal 142, o-ring 143, shim washer 144 and seal spring 145. Downstream of seal 142 is the interior volume of the tire being controlled by the central tire inflation system 100. The seal 142, o-ring 143, shim washer 144 and seal spring 145 reside inside of the portion 130 of the seat cup 44 when assembled. The lower seal/spring group 46 is operably coupled to seat cup 44 and is secured utilizing hat washer 47. The lower seal/spring group 46 includes o-rings 146,147, 148 and plunger 149 operably coupled with spring 49. The plunger 149 is sealably coupled against seat cup 44 being biased thereagainst by spring 49. As will be further discussed herein, the check valve assembly 40 provides an adjustable technique to maintain a minimum air pressure for all tires to which the wheel assembly 10 is fluidly coupled. Spring 49 is configured to have adjustable tension so as to allow a user of the central tire inflation system 100 to set a minimum air pressure for the tires operably coupled thereto. By way of example but not limitation, it is contemplated within the scope of the present invention that the spring 49 has a tension so as to inhibit a pressure lower than 20 PSI within the tires.

The bearing/cap assembly 50 is operably disposed within the cavity 16 of the central portion 13. The bearing/cap assembly 50 includes the following elements: cover 51, cap 52, roller bearing 53, tube 55, retaining ring assembly 55, seal group 56 and adjustment screw 57. Seal group 56 comprises o-ring 156, seal washer 157 and retaining ring 158. A grease fitting 59 is operably coupled to cover 51 and provides an operable coupling technique to inject the necessary lubricant into the cavity 16 of the central portion 13.

The aforementioned elements of the bearing/cap assembly 50 provide rotatable coupling of the check valve assembly 40 within the cavity 16 of the central portion 13. It is contemplated within the scope of the present invention that alternate configurations of the bearing/cap assembly 50 could be provided with alternate elements and still achieve the desired functionality discussed herein. Central portion 13 includes aperture 60 that is a port for air to be fluidly directed to a tire to which the wheel assembly 10 is mounted.

Figure 3:
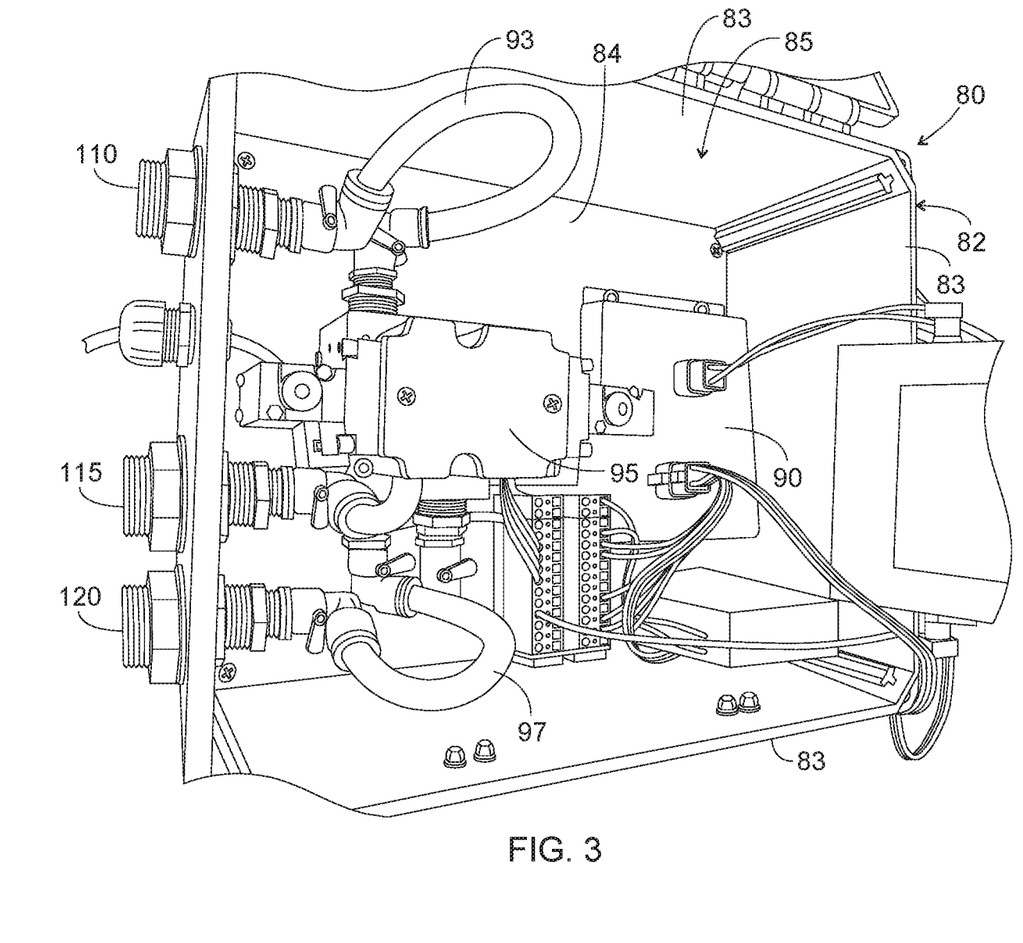
FIG. 3 is a detailed view of the controller of the present invention.

Illustrated in particular in FIG. 3 herein is the controller 80. The controller 80 is operably coupled to the wheel assembly 10 and includes the necessary electronic and pneumatic components to facilitate the operation of the central tire inflation system 100. Controller 80 includes housing 82 that is formed from a rigid material such as but not limited to metal or plastic and is generally rectangular in shape having integrally formed walls 83 and a bottom 84 forming an interior volume 85. It should be noted that in FIG. 3 herein that a top for the controller 80 is not illustrated so as to show the internal components thereof. Disposed within the interior volume 85 of the housing 82 is central processing unit 90. The central processing unit 90 includes the necessary electronic components to store, receive, transmit and manipulate data to provide operation of the central tire inflation system 100. The central processing unit 90 is operable coupled to valve 95 and provides control thereof. Valve 95 is a conventional pneumatic valve that is pneumatically coupled to the wheel assembly 10 via the first port 110. The valve 95 is pneumatically coupled to a first port 110, a second port 115 and a third port 120. The valve 95 under operable control of the central processing unit 90 will direct airflow as required to achieve an input air pressure for tires operably coupled to the wheel assembly 10. The first port 110 is fluidly coupled to valve 95 utilizing tube 93. First port 110 is fluidly coupled to the wheel assembly 10 utilizing conventional hosing (not illustrated herein). In the event that a tire operably coupled to a wheel assembly 10 has a air pressure lower than that required, the valve 95 will move to a position such that the valve 95 will direct air flow into tube 93 and discharge from the first port 110 so as to be transported to the tire(s) so as to achieve the desired minimum air pressure. Third port 120 is operably coupled to a conventional air source such as but not limited to an air tank or an air compressor (not particularly illustrated herein). When an increase in air pressure for a tire(s) operably coupled to a wheel assembly 10 is required, the valve 95 is positioned so as to receive air from the third port 120 and discharge air from the first port 110. The third port 120 is fluidly coupled to the valve 95 utilizing tube 97. In the inflate mode of the central tire inflation system 100 the valve 95 will intake air from an air source via third port 120 and discharge air via the first port 110 which is directed to the tires having the wheel assembly 10 operably coupled thereto. The valve 95 further includes an integrated pressure sensor (not illustrated herein) that monitors the air pressure within the central tire inflation system 100 and will provide either inflation or deflation of the tires operably coupled to the wheel assembly 10 as needed.

In the deflate mode, the controller 90 will provide deflation of the tires operably coupled to the wheel assembly 10. As will be further discussed herein, the central tire inflation system 100 provides a user the ability to both inflate and deflate the tires programmatically through a control panel 150. In the deflate mode, the valve 95 is positioned so as to permit airflow inward from the first port 110 and is discharged through the second port 115. The second port 115 is a discharge port that is atmospherically coupled to the external environment wherein the air received from the first port 110 in the deflate mode is discharged into the environment via the second port 115.

Figure 4:
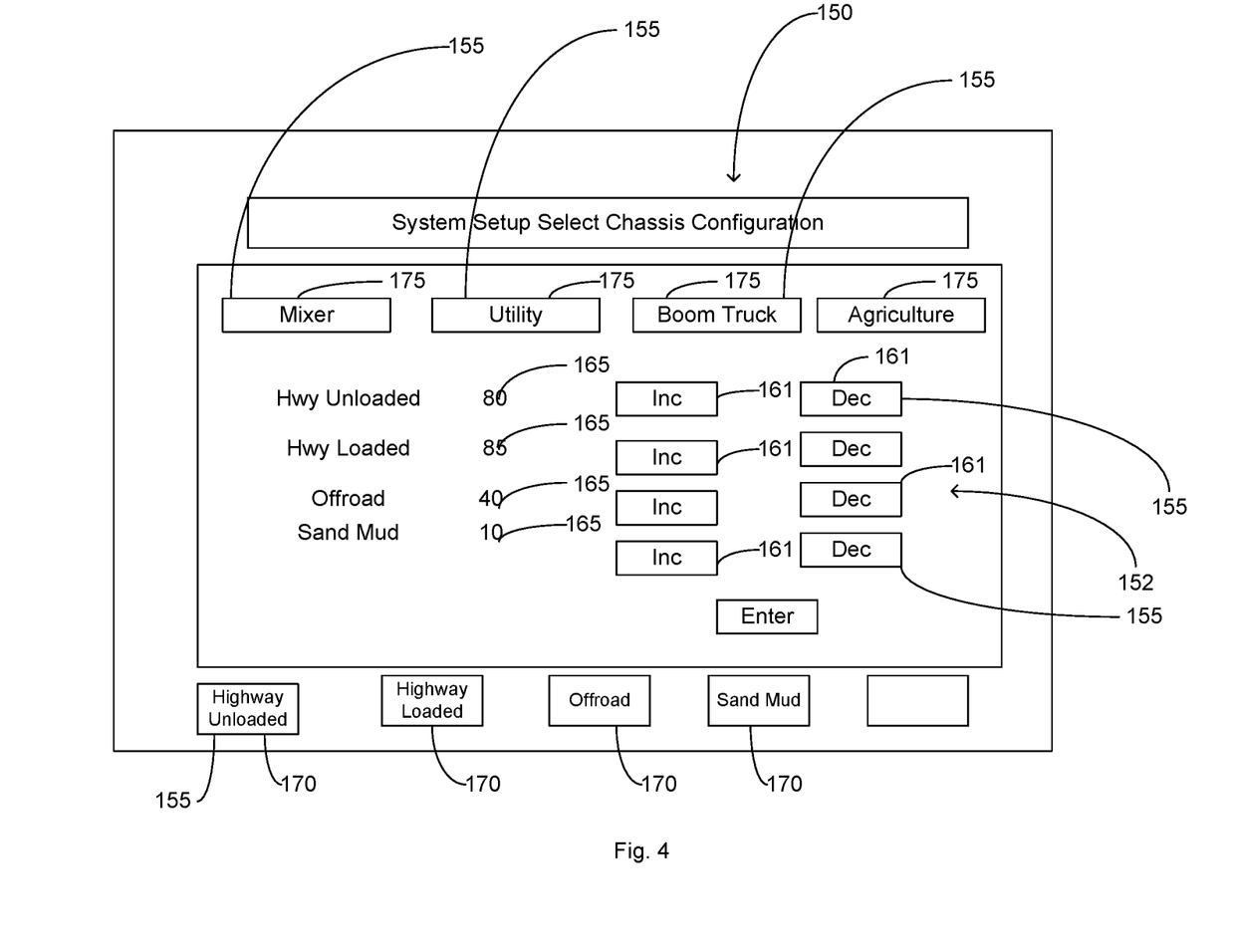
FIG. 4 is a diagrammatic view of the control panel and an exemplary screen display of the present invention.

Referring to FIG. 4 herein, a diagrammatic view of the control panel 150 is illustrated therein. The control panel 150 includes a graphical display 152 having a plurality of icons 155 and functions to provide the user interface for a user to operate the central tire inflation system 100. The graphical display 152 is a conventional touch screen interface and the control panel 150 is operably coupled to controller 80. Icons 175 are vehicle type icons. The central tire inflation system 100 is designed to be installed on various vehicle types that are utilized in alternate industries so as to execute a desired task. By way of example but not limitation, the central tire inflation system 100 can be mounted to a concrete mixer truck or a power utility truck. Both of the aforementioned vehicle types operate in different conditions and traverse across various terrains during execution of the intended functionality for that vehicle type. As such, the required tire pressure for the tires on the aforementioned vehicles must not only maintain a minimum air pressure but it is further desired that the operator of the vehicle be able to alter the air pressure within the tires depending upon the type of surface the vehicle is being driven on and what type of load the vehicle may be subjected to during operation. The vehicle type icons 175 provide the user of the central tire inflation system 100 to set desired tire air pressure through engagement of just the vehicle type icon and the default parameters stored in the central processing unit 90 for the vehicle type activated and initiated. While the graphical display 152 control panel 150 has illustrated herein four vehicle type icons 175 and further has exemplary vehicle types listed thereon, it is contemplated within the scope of the present invention that the control panel 150 could have more or less than four vehicle type icons 175 and could further have alternate vehicle types and parameters therefore programmed into the central processing unit 90.

The graphical display 152 further has displayed thereon adjustment icons 161. The adjustment icons 161 have indicia therein indicating increase or decrease more specifically abbreviations, Inc and Dec. The adjustment icons 161 provide a technique to a user to adjust the default tire air pressure for the current mode displayed on the graphical display 152. In the exemplary parameters illustrated in FIG. 4 herein, the recommended highway unloaded tire air pressure that is desires, set and monitored is 80 PSI. If a user desires to alter the default setting of 80 PSI, the user will engage the adjustment icons 161 so as to increase and/or decrease the default PSI setting. Ensuing the adjustment of the default air pressure, the central processing unit 90 stores the adjusted values for the default air pressure. It is contemplated within the scope of the present invention that the tire air pressure parameter settings 165 can be adjusted and stored in the central processing unit 90. It is further contemplated within the scope of the present invention that the central tire inflation system 100 could require a password in order to permit a user to execute the aforementioned adjustments to default air pressure. It should be understood that FIG. 4 depicts a system setup screen display for the central tire inflation system 100. It is further contemplated within the scope of the present invention that numerous alternate screens will be displayed on the graphical display 152 of the control panel 150. These alternate screens are further discussed herein and include but are not limited to a warning screen, a fault log screen, a diagnostic screen and a manual control screen. Still referring to FIG. 4, the graphical display 152 of the control panel 150 further includes mode selection icons 170. The mode selection icons 170 provide a user an interface to identify and select the driving mode in which the vehicle that the central tire inflation system 100 is operably coupled. Each alternate mode has associated therewith tire air pressure parameters and subsequent selection and activation of the mode, the central processing unit 90 will initiate the central tire inflation system 100 to inflate and/or deflate the tire air pressure according to the parameters associated with the selected mode. By way of example but not limitation, it is contemplated that the central tire inflation system 100 provides operational modes such as highway loaded, highway unloaded, off-road or sand-mud mode. These aforementioned operational modes have associated therewith pre-programmed tire air pressure parameters designed for the operational mode so as to provide the correct tire air pressure for the application of use. Furthermore, ensuing selection of the mode and activation thereof, the central processing unit 90 will continuously monitor the tire air pressure and make adjustments thereto in order to maintain the parameter settings for the selected mode. Additionally, each deviation from the tire air pressure parameters associated with active selected mode is recorded and stored in a fault log database within the central processing unit 90 for subsequent access thereto.

Figure 5:
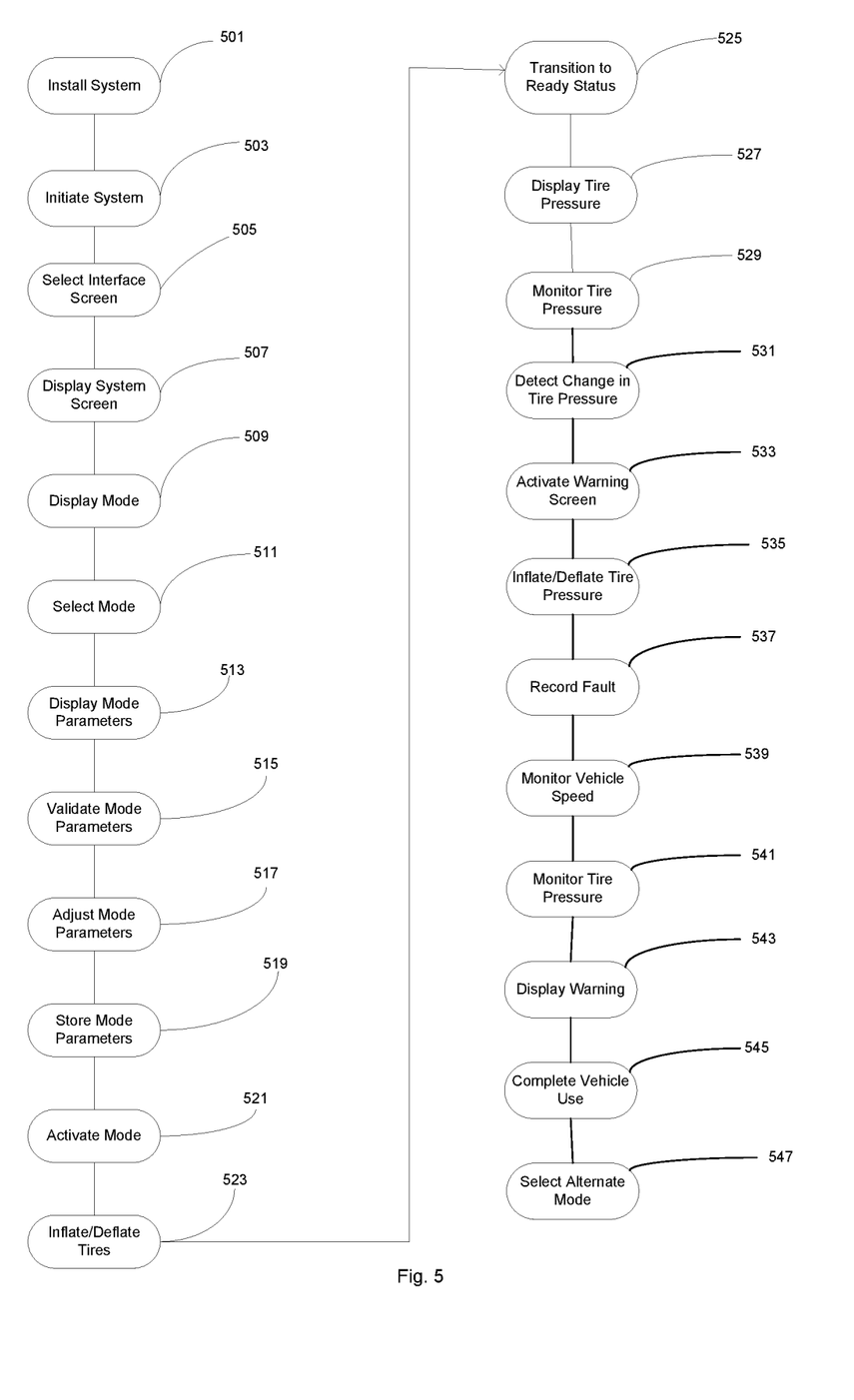
FIG. 5 is a flow chart of an exemplary method of use of the present invention.

Referring now to FIG. 5 herein, a method of operation of the central tire inflation system 100 is as follows. In step 501, the central tire inflation system 100 is installed on a vehicle such as but not limited to a commercial truck. Installation of the central tire inflation system 100 includes but is not limited to tasks such as mounting the wheel assembly 10 to the tires of the commercial truck and placing the controller 80 and control panel in the passenger compartment thereof. In step 503, the central tire inflation system 100 is initiated wherein the central processing unit 90 is activated and the control panel 150 is utilized to commence system operation. Step 505, the user will be provided an interface screen to continue operation of the central tire inflation system 100, wherein the interface screen is at least one of the following: a diagnostic screen, a warning screen, a fault log screen, a manual control screen and a system set up screen. In step 507, a user will select the system set up screen, which has been illustrated herein in FIG. 5. Step 509, the control panel 150 will display both vehicle type icons 175 and mode selection icons 170. In step 511, a user will select a vehicle type and a mode of use as previously discussed herein. Step 513, the control panel 150 will display the mode parameters on the graphical display 152. In step 515, the user will be prompted to validate the mode parameters that have been displayed on the graphical display 152. Step 517, the user may either validate the mode parameters or adjust the mode parameters utilizing the adjustment icons 161. It should be understood within the scope of the present invention that only an authorized user with a password can make adjustments to the mode parameters utilizing the adjustment icons 161. In step 519, if the mode parameters were adjusted utilizing the adjustment icons 161, the central processing unit 190 records and stores the adjusted mode parameters.

Step 521, the user will activate the selected mode and the central tire inflation system 100 will initiate operation. In step 523, the central tire inflation system 100 will detect an initial tire air pressure and will either inflate or deflate the tires as necessary so as to align with the mode parameters activated. Step 525, the central tire inflation system 100 will transition to an initial ready status wherein the tires have been adjusted to the air pressure as defined in the selected mode. In step 527, the central tire inflation system 100 will display the current tire pressure on the graphical display 152. Step 529, the central tire inflation system 100 will continuously monitor the tire air pressure on which the central tire inflation system 100 is installed. In step 531, the valve 95 having the integrated pressure sensor detects a pressure in a tire that has deviated from the tire air pressure parameter in the active mode. Step 533, the central processing unit 90 transmits a signal to the control panel 150 to display a warning signal on the graphical display that a tire has an air pressure that has deviated from the stored parameters for the active mode. In step 535, the central processing unit 90 transmits a signal to the valve 95 to initiate either inflation or deflation of the tires so as to return the tire air pressure to the tire pressure parameter of the active mode. Step 537, the central processing unit 90 records the deviation and stores in the memory thereof particularly in a fault log database for future access by a user. In step 539, the central tire inflation system 100 continues to monitor the tire air pressure of the vehicle and further monitors the speed of the vehicle. It is contemplated within the scope of the present invention that the central tire inflation system 100 could be operably integrated into the speedometer of the vehicle so as to extract the vehicle speed and display on the graphical display 152 of the control panel 150. Those skilled in the art should recognize that the vehicle speed could be obtained utilizing alternate devices and/or techniques. In step 541, the central tire inflation system 100 continues to monitor the tire pressure and compare to the tire pressure parameters of the active mode. Step 543, the central tire inflation system 100 will display a warning if the vehicle speed exceeds the recommended speed for the active mode. The warning signal is generated by the central processing unit 90 and is transmitted to the control panel 150 for display to the user. In step 545, the user completes the vehicle use. In step 547, a second user will select a mode in which the user will begin to utilize the vehicle to which the central tire inflation system 100 is mounted. The aforementioned second user could be the same individual initiating re-use of the vehicle. Operation of the central tire inflation system 100 returns to step 513 and resume all of the aforementioned steps of operation through step 513 to step 545.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A central tire inflation system configured to monitor and maintain an air pressure on tires of a vehicle comprising:
   a wheel assembly, said wheel assembly configured to be operably coupled to a wheel of a motor vehicle, said wheel assembly including a housing, said wheel assembly having a central portion, said central portion being annular in shape and having an interior volume, said wheel assembly further including a first arm member and a second arm member, said first arm member and said second arm member extending outward from said central portion from opposing sides thereof;

a valve assembly, said valve assembly being disposed within said interior volume of said central portion of said housing, said valve assembly fluidly coupled to the tires of the vehicle, said valve assembly operable to maintain a minimum air pressure within the tires of the vehicle, said valve assembly further including a seat cup, said valve assembly having an upper seal and spring group, said upper seal and spring group being on a first side of the seat cup, said valve assembly having a lower seal and spring group, said lower seal and spring group being on a second side of the seat cup;

a controller, said controller having a housing, said housing of said controller having a plurality of walls and a bottom forming an interior volume, said controller having a central processing unit, said central processing unit having an electronic processing unit operable to receive, store, transmit and manipulate data, said controller having a plurality of modes of operation wherein said modes of operation include default parameters for air pressure within the tires of the vehicle, said controller further having a valve, said valve configured to direct air flow as required into or out of the tires, said valve being operably coupled to said wheel assembly; and wherein the central tire inflation system is configured to monitor air pressure of the tires and provide inflation or deflation thereof based the mode of operation.

2. The central tire inflation system as recited in claim 1, wherein said first arm member and said second arm member further include an aperture, said aperture being a joined circle configuration, said aperture further having a ledge.

3. The central tire inflation system as recited in claim 2, wherein said controller further includes an air pressure sensor, said air pressure sensor operable to monitor air pressure of the tires of the vehicle.

4. A central tire inflation system configured to be mounted on a vehicle wherein the central tire inflation system controls the air pressure of tires on the vehicle and comprises the steps of:

installing the central tire inflation system, said central tire inflation system having a wheel assembly, said wheel assembly configured to be operably coupled to a wheel of a motor vehicle, said wheel assembly including a housing, said wheel assembly having a central portion, said central portion being annular in shape and having an interior volume, said wheel assembly having a valve assembly disposed in the central portion thereof, said valve assembly fluidly coupled to the tires of the vehicle, said valve assembly operable to maintain a minimum air pressure within the tires of the vehicle, said valve assembly further including a seat cup, said valve assembly having an upper seal and spring group, said upper seal and spring group being on a first side of the seat cup, said valve assembly having a lower seal and spring group, said lower seal and spring group being on a second side of the seat cup, said wheel assembly further including a first arm member and a second arm member, said first arm member and said second arm member extending outward from said central portion from opposing sides thereof, said central tire inflation system further including a controller, said controller having a housing, said housing of said controller having a plurality of walls and a bottom forming an interior volume, said controller having a central processing unit, said central processing unit having the necessary electronics to receive, store, transmit and manipulate data, said controller further having a valve, said valve configured to direct air flow as required into or out of the tires, said valve being operably coupled to said wheel assembly;

activating the central tire inflation system;

providing a plurality of operational modes, wherein a user can select from the plurality of operational modes;

selecting one of said plurality of operational modes;

providing tire air pressure parameters for the selected operational mode;

displaying tire air pressure for the selected operational mode;

activating the selected operational mode;

measuring the tire air pressure within the tires of the vehicle;

adjusting the tire air pressure so as to be equal to the tire air pressure parameters for the selected operational mode;

monitoring the tire air pressure in the tires of the vehicle;

detecting a tire air pressure that has deviated from the tire air pressure parameters for the selected operational mode;

displaying a warning to a user of the vehicle;

adjusting the tire air pressure parameters so as to return the tire air pressure parameters to the provided tire air pressure parameters of the operational mode;

recording the deviated tire pressure in a fault log database;

providing a history of deviated tire pressures; and selecting an alternate operational mode.

* * * * *

UNITED STATES PATENT AND TRADEMARK OFFICE
CERTIFICATE OF CORRECTION

PATENT NO. : 10,493,808 B1  
APPLICATION NO. : 15/660065  
DATED : December 3, 2019  
INVENTOR(S) : Bradley Dunst and Mark Oostdyk Page 1 of 1

It is certified that error appears in the above-identified patent and that said Letters Patent is hereby corrected as shown below:

On the Title Page

Item (12) should read Dunst et al.

Item (72) Scott McCauley and Alfred Robert Tominson were listed as inventors. The correct inventors are Bradley Dunst Cocoa, FL and Mark Oostdyk Cocoa, FL.

Signed and Sealed this  
Twentieth Day of May, 2025

Coke Morgan Stewart  
*Acting Director of the United States Patent and Trademark Office*